Figure 1:
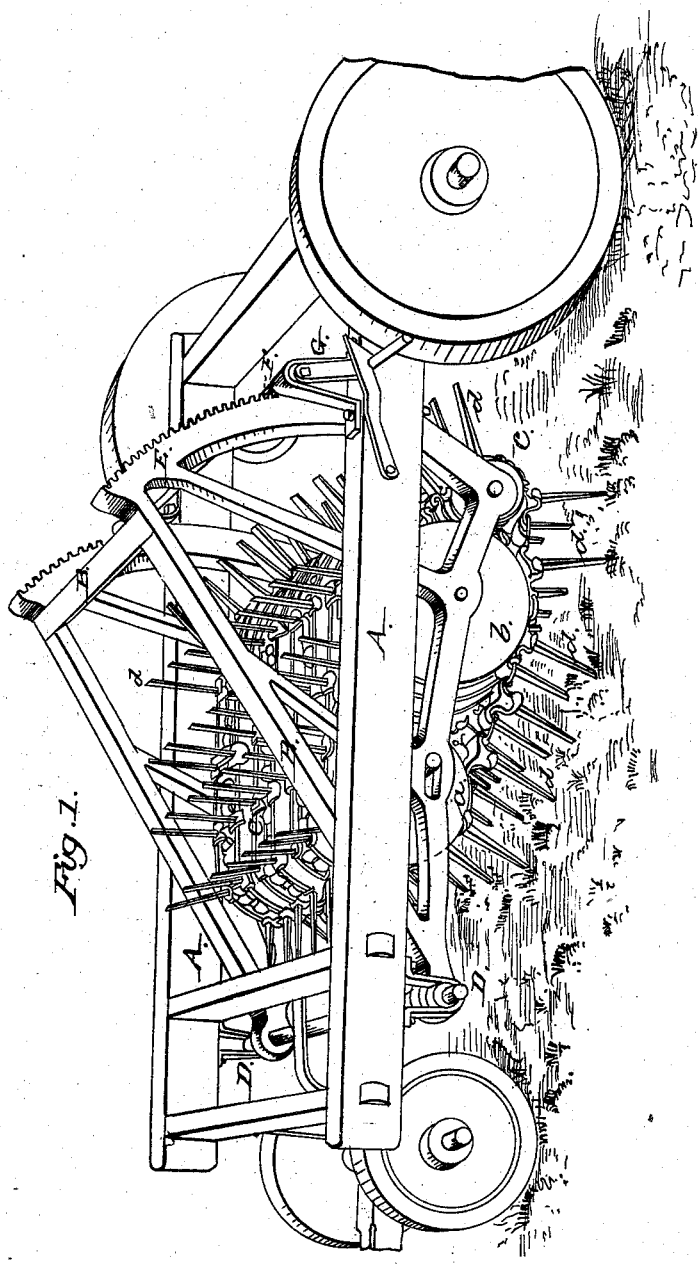

D. MANN.
Steam-Plow.

No. 1,133, 32,137.

2 Sheets—Sheet 1.

Patented Apr. 23, 1861.

Witnesses:

Inventor:
Donald Mann

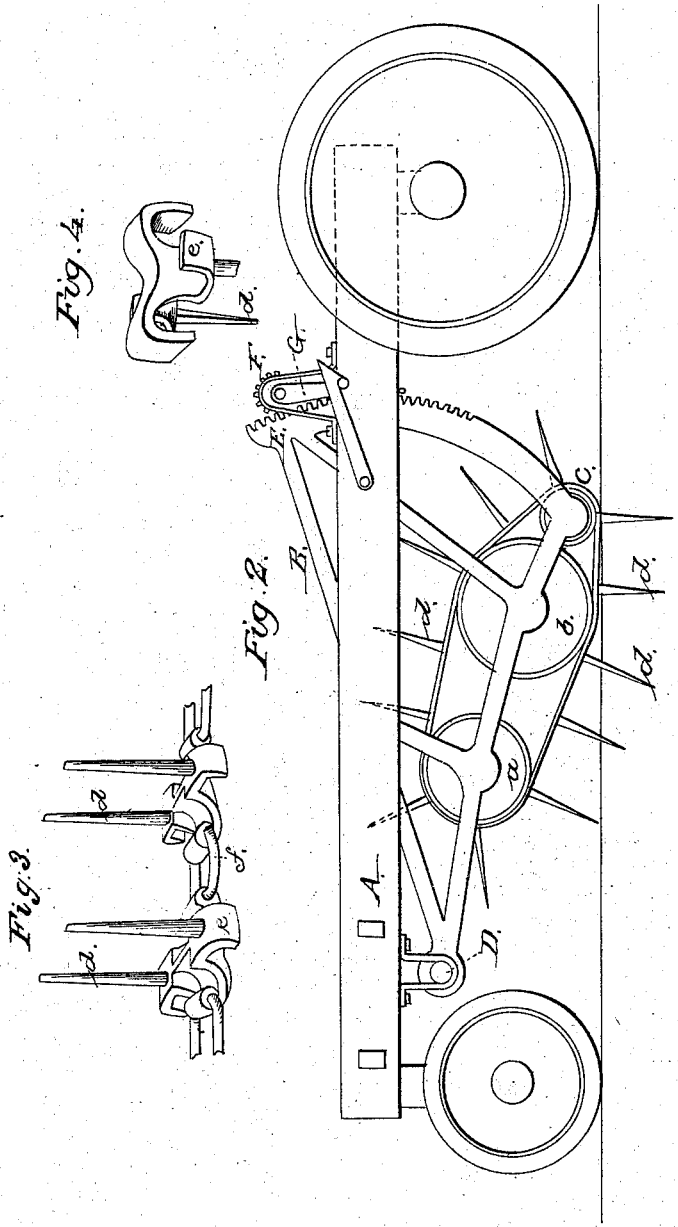

UNITED STATES PATENT OFFICE.

DONALD MANN, OF ROCHESTER, NEW YORK.

IMPROVEMENT IN ROTARY SPADING-MACHINES.

Specification forming part of Letters Patent No. 32,137, dated April 23, 1861.

*To all whom it may concern:*

Be it known that I, DONALD MANN, of Rochester, State of New York, have invented a certain new and useful Improvement in Rotary Digging or Spading Machines; and I do hereby declare that the following is a full, clear, and exact description thereof, and of its construction and mode or manner of operation, reference being had to the accompanying drawings, and to the letters of reference marked thereon making a part of this specification.

My invention consists of improvements in the construction and arrangement of a rotary digging or spading machine which was the subject of Letters Patent of the United States granted to Ormrod C. Evans on or about the 4th day of November, 1856.

The invention of Evans consists of a series of drums and rollers (three in number) placed in front and rear of each other, and revolving on separate shafts or axles parallel with each other, and all of them being held together and in position by a suitable frame, which is the only frame of the working machine. The central drum, which is much the largest, revolves directly upon the ground and carries the whole machine when at work. The forward roller is somewhat in advance of the central one and a little above the ground, and the rear one is also a little away from the central one, but nearer the ground than the forward one, and is so placed in respect to the central drum that as the endless chain, hereinafter mentioned, passes up over such back roller onto the central drum it passes or rises perpendicularly, or nearly so. Around these several drums and rollers passes an endless chain carrying forks or spades which are pressed into the ground by the onward movement of the machine. Any number of such drums or rollers may be placed side by side to obtain any desired width of machine. The front roller, as the chain passes over it, brings the forks, when coming in contact with the ground, into a position nearly perpendicular with the surface of the ground, so that as the central drum revolves forward on the ground it presses the teeth and chains into the ground, and the back roller causes the forks, when leaving the ground, to turn at a right angle, or nearly so, and pass up with a sudden movement to break and stir the soil.

When Evans's machine is to be lifted from the ground for the purpose of transporting it from place to place, or for any other purpose—and it is very difficult, if not practically impossible, to turn it without lifting the forks out of the ground—the whole of the machine, with all its drums and rollers, has to be lifted perpendicularly and a distance exceeding the length of the forks, so as to free it from the ground. As the weight of his machine is great, and as it requires a great number of teeth constantly in the ground, the pressure of the earth around all of which tends to make their withdrawal more difficult, the power required to lift it is very great, or the process of lifting slow.

These are the principal features of Evans's machine, but reference to his patent will show all its characteristics.

My invention or improvement consists generally in arranging and supporting the rollers or drums carrying the endless chains of forks or spades in a frame separate and distinct from that which is made the carrying truck or frame of the machine, by which I am enabled to reduce the size and weight of the rollers or drums, shorten the endless chains and dispense with the greater number of the forks or spades required in Evans's machine, and in so arranging such frame that carries the drums and endless chains in respect to the carrying truck or frame and supporting it therefrom that the digging apparatus can be easily raised and with a comparatively little expenditure of power, (as only about one-half of its weight has to be raised,) and the whole machine of combined carrying-truck and digging apparatus be at once ready for transportation from place to place.

Figure 1 is a perspective view of such a machine containing my improvements. Fig. 2 is a vertical section of Fig. 1. Figs. 3, 4 are views of the links carrying the forks or spades.

The carrying truck or frame A, to which is attached the frame B, which supports the digging apparatus, may be of any length and width desired or found most convenient. For two or three horses it may be about four feet wide by eight or nine feet long. Within this truck or carrying-frame A is suspended the frame B, which carries the drums or rollers $a b c$, around which pass the endless chains C, which carry the forks or spades $d\ d$. The journals of all these rollers are in the opposite sides of the frame B, and they may be so arranged as to be moved nearer to or farther from each other to tighten the endless chain, &c. The rollers *a* and *b* may be of about the same size, or one may be somewhat larger than the other, and they need not be more than one-quarter the size of the large drum in Evans's machine.

The frame B is connected with and suspended from the truck A by bolts D D, or an axle in place thereof, passing through one end of such frame B, so that that frame and the rollers *a b c* and endless chains C can be elevated and lowered as desired, and this with lifting only about one-half the weight of such rollers and chains.

Around the rollers *a b c* pass the endless chains C, to which are fixed the forks or spades *d d*. For a machine of the size and width above referred to four chains will be used, each of which may have two rows of forks, and which may be about four or five inches apart. The whole number of forks or spades *d d* required in my improved machine is only about one-third of that used in Evans's original machine.

When the machine is at work the frame B is lowered, as shown in Fig. 2, and the several rollers are then in the position seen in that figure. When so at work the hind wheels of the truck A are intended to revolve on the surface of the ground, and the weight of the truck A will act, with the weight and pressure of the digging apparatus, to force the forks *d d* into the ground. Extra weight may also be added for that purpose, if necessary.

When the machine is at work the roller *a* is higher than the others, and is so placed that as the endless chain C leaves it and the forks *d d* begin to touch the ground they will be at right angles, or nearly so, with the surface of the ground. The roller *b*, as the machine is moved forward, presses the forks into the ground. The roller *c* is so placed in respect to the roller *b* as to cause the forks *d d*, when they are leaving the ground, to receive a sudden jerk or flirt, the effect of which is that the ground is effectually broken and pulverized. By the arrangement of the large drum and small rear roller in Evans's machine the forks, as they leave the ground, turn only about a right angle, but in my improvement, by changing the relative size and position of the rollers *b c*, the forks are caused, as they pass onto and over the roller *c*, to turn more than a right angle, and have therefore a greater flirt, thus increasing the effect in pulverizing the soil. By carrying the roller *c* still farther from *b* a more sudden turn may be given to the forks. The arrangement in Evans's machine renders any such adjustment very difficult.

In Evans's machine, as the large drum which forces the forks into the ground presses and revolves on the ground, not only the forks are forced into the soil, but the links to which the forks are attached will also be pressed and bedded into the ground, and these, as the machine revolves, will offer great resistance and require an expenditure of power to overcome it; but by my improvement, placing the digging apparatus in a separate frame and suspending it from the truck, so that its elevation or depression can be regulated, the forks only are allowed to enter the ground, and the links do not, and thereby the draft of the machine is materially diminished. By also reducing the size of the rollers and materially shortening the endless chains a great amount of friction is removed and the draft of the machine to the same extent rendered easier.

When the machine is not at work the frame B and the digging apparatus are raised, as shown in Fig. 1, so that the forks *d d* will be above the ground. The truck A then at once becomes a carrying-truck, and the machine can be transported from one place to another.

To lift the frame B and the digging parts of the machine I employ a guard segment or sector, E, the curve of which is taken from the points D, and which is fixed to or made a part of the frame B. On each side of and supported on the truck A is a pinion, F, which is turned by the winch G working into the sector E, and by which the frame B is raised or lowered, as may be desired. Instead of the winch G a rod, one end of which gears into the segment E, may extend forward to the driver's seat and be so arranged that by it the frame B can be raised or lowered by the driver while he remains in his seat.

By so arranging the digging apparatus that it can be raised or lowered as desired I can also regulate and govern the extent of the penetration of the forks *d d* according to the character of the soil or the kind of cultivation desired. In a proper soil the forks may be made to penetrate their entire length, while for loosening or scarifying turf or grazing land they can be regulated to penetrate but a few inches. In Evans's machine such a result can be obtained only by having various sets of teeth or forks of different lengths and substituting one for the other. Such arrangement also enables the driver or conductor of the machine to raise the forks, when necessary, to allow them to pass over any fixed obstacle, as a projecting rock or stump, without injury to the machine.

Fig. 3 shows a couple of the links of the endless chain C, with the forks or spades *d d* fixed to them and connected together by the strong chain-links *f*. Fig. 4 represents the under side of the link, showing the bent edges *e* to run over the rims of the rollers *a b c*, and the middle part curved to correspond with the roller *c*, so as to pass round it with but little friction.

Different plans may be devised for arranging the frame B, with its rollers and the endless chain, in respect to the truck A, and for raising and lowering such frame B or the digging apparatus and holding it or them in any position.

My improvements thus consist in radical variations from the machine of Evans, by which I greatly economize in cost and power, and at the same time do the work more perfectly.

By combining a carrying truck or frame with the digging apparatus and arranging and placing the rollers $a\ b\ c$, with the endless chain C, in a separate frame connected with the carrying-truck, substantially as described, I obviate entirely the necessity of the large and heavy drums and rollers used in Evans's machine, and without which his machine could not work at all; and by dispensing with these I also greatly reduce the length of chain, and thereby lessen greatly the friction of the machine, and also much diminish the weight of the whole machine.

By suspending the frame containing the digging apparatus in the carrying-truck, substantially as described, I am enabled to lift the digging apparatus with comparative ease, as instead of lifting its whole weight I have to lift only about one-half its weight, and I am able to apply the power required at an advantage; and by so arranging and suspending the digging apparatus I am also able, without any change of the forks or spades, to regulate and govern the depth of cultivation, as may be desired, and can also raise the digging apparatus, when necessary, to avoid or escape anything in the way of its progress.

By my improvements the whole apparatus or machine is rendered very compact, and can be made so light as to be practically adapted for ordinary uses and capable of being easily worked by two or three horses, while Evans's machine, adapted to do the same amount of work, requires from four to six horses, and the entire machine can be furnished at such a price as to be within the reach of all.

I do not claim the use of endless chains carrying forks or spades and revolving over drums or rollers for the purpose of cultivating or stirring the soil; but

What I claim as my invention, and desire to secure by Letters Patent, is—

Arranging the drums or rollers $a\ b\ c$, with their endless chains C, in the separate frame B, substantially as and for the purposes set forth.

DONALD MANN.

Witnesses:
S. D. LAW,
JNO. C. WILSON